Figure 1:
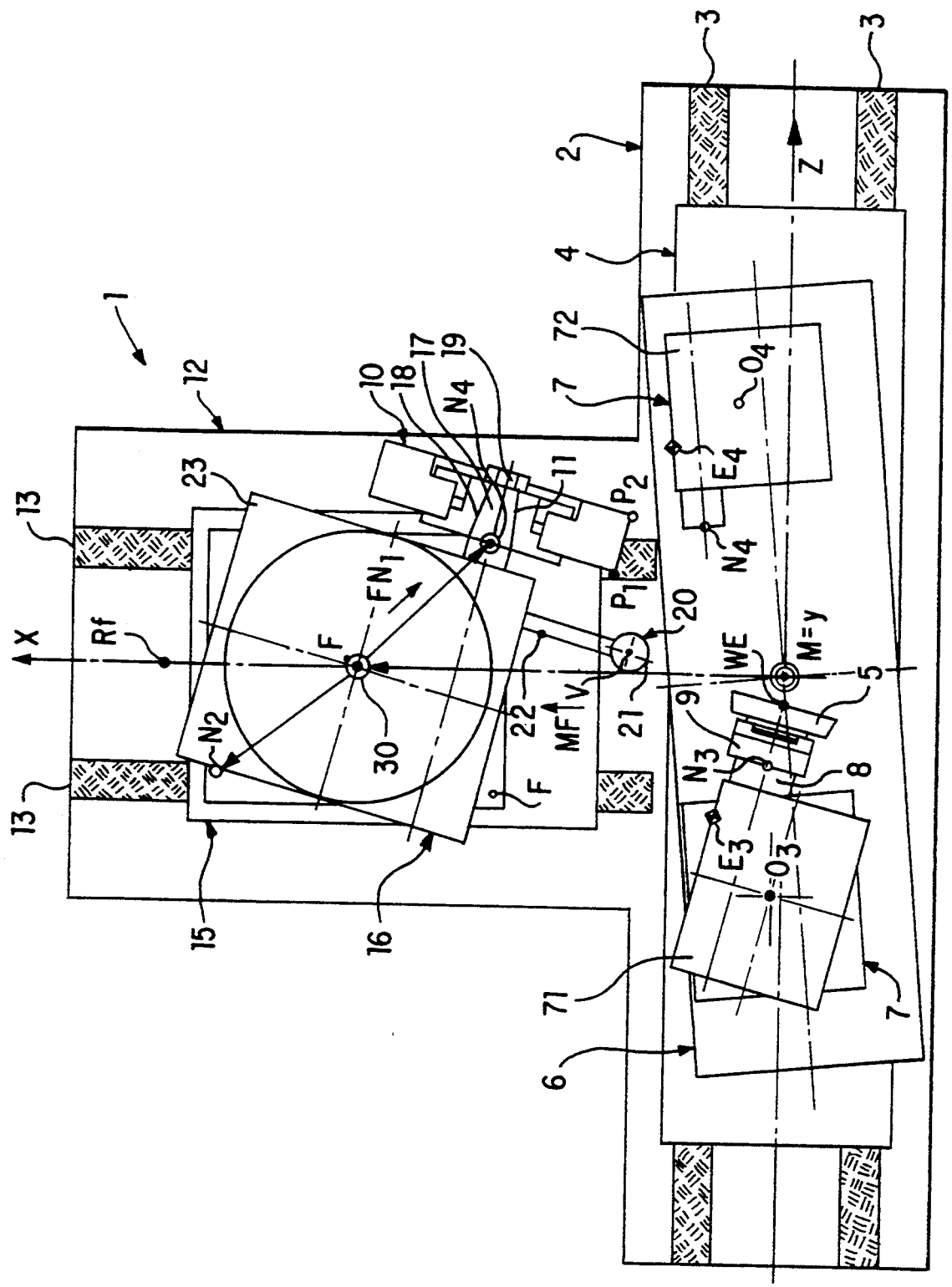

United States Patent [19]

Ilek et al.

[11] Patent Number: 5,335,454
[45] Date of Patent: Aug. 9, 1994

[54] PROCEDURE FOR THE NUMERICAL CONTROL OF A WORKPIECE ON A GRINDING MACHINE

[75] Inventors: Anton Ilek, Eggersriet; Hugo Thurnherr, St. Gallen; Emil Eugster, Appenzell, all of Switzerland

[73] Assignee: L. Kellenberger & Co. AG, St. Gallen, Switzerland

[21] Appl. No.: 961,818

[22] Filed: Oct. 19, 1992

[51] Int. Cl.$^5$ ............................................ B24B 49/00
[52] U.S. Cl. .............................. 51/165.75; 51/165.87; 51/165.88; 51/165.74
[58] Field of Search ............ 51/165.71, 165.74, 165.75, 51/165.87, 165.88

[56] References Cited

U.S. PATENT DOCUMENTS

| | | | |
|---|---|---|---|
| 3,897,659 | 8/1975 | Henry | 51/165.71 |
| 4,371,942 | 2/1983 | Damikolas | 51/165.71 |
| 4,584,796 | 4/1986 | Yoneda et al. | 51/165.71 |
| 4,704,825 | 11/1987 | Moore | 51/290 |
| 4,709,509 | 12/1987 | Yoneda et al. | 51/165.71 |
| 5,027,562 | 7/1991 | Kobayashi et al. | 51/165.77 |

FOREIGN PATENT DOCUMENTS

| | | | |
|---|---|---|---|
| 0416258 | 3/1991 | European Pat. Off. | |
| 3736463 | 5/1989 | Fed. Rep. of Germany | |
| 59-343 | 4/1984 | Japan | 51/165.74 |
| 109683 | 4/1990 | Japan | 51/165.71 |
| 2059825 | 4/1981 | United Kingdom | |

*Primary Examiner*—Jack Lavinder
*Attorney, Agent, or Firm*—Wegner, Cantor, Mueller & Player

[57] ABSTRACT

A procedure for the numerically controlled processing of a workpiece on a grinding machine having a workholder for the workpiece as well as a wheelhead equipped with a grinding wheel, the wheelhead being pivoted on a wheelslide and able to be shifted together with the wheelslide in relation to the workholder, including detecting positions of a set of points situated within a working range of the grinding machine, covering coordinates of the set of points into basic data for a processing program of the grinding machine, and taking the basic data of the coordinates of the set of points into account while the workpiece is processed. A gauge is attached to the wheelhead and to a measuring device at a zero (M) of the machine, a spherical measuring head of the gauge presents a measuring point (IV) for detecting an initial position of the spherical measuring head in a coordinate system (X,Z) of the machine and coordinates of an existing position of the spherical measuring head are detected with the aid of the measuring device. A control unit enables an end position of the spherical measuring head to be detected where the measuring point (V) of the spherical measuring head would be if the wheelhead, which can be swivelled around a swivel axis (F), is swivelled through a specified angle, and the measuring point (V) passes through a patch (B). A check is performed to verify whether there is an discrepancy between an actual position of the spherical measuring head and the end position of the spherical measuring head.

13 Claims, 6 Drawing Sheets

PROCEDURE FOR THE NUMERICAL CONTROL OF A WORKPIECE ON A GRINDING MACHINE

The present invention relates to a procedure for the numerically controlled processing of a workpiece on a grinding machine equipped with a holder for the workpiece as well as having one or several grinding wheels, wherein this grinding wheel is pivoted on a workpiece slide, and can be shifted together with the said slide in relationship to the workpiece holder.

In a process of this generic type known in the art, the machine performing this process has a spherical measuring head attached to the side facing the grinding wheel in such a way that the measuring pin is able to swivel. It is assumed that the position of the extended gauge in relation to the work surface of the grinding wheel is known during this process and it is indicated by the distances in two directions perpendicular to each other. After the workpiece has been clamped in a clamping device or chuck, it is then moved first in one direction and then in the other until the gauge touches two surfaces of a shoulder of the workpiece, the said surfaces being at right angles to each other. Thus the position of the workpiece is detected in relation to the gauge and consequently also in relation to the working surfaces of the grinding wheel. Starting from these initial data, the control system of the machine calculates the paths in each of the two directions to be followed by the tool and/or the workpiece in order for the workpiece to be processed by the grinding wheel in the manner intended.

A grinding machine has several parts which move in relation to one another. The process described and known in the art assumes that the relative position of all movable parts to one another is known and stored in the memories of the control system of the machine. In order to store the said relative positions of each machine part however, it must be assumed that values corresponding to theses positions have been determined. The procedure by which these positions are detected can be described as gauging the machine.

Even if the position of the machine parts in relation to one another are known when beginning to process a workpiece, this position may well alter during the operation of the machine so that consequently the dimensions of the products do not coincide with the set dimensions. Moreover, it is preferable to have the opportunity of making certain at any moment while the machine is in operation and with no waste of time, and if possible also by automatic means, that the relative position of the machine parts has not changed. If the relative position has altered, it is desirable to be able to determine automatically the extent of the deviation and finally to eliminate this deviation automatically. This can contribute to greater precision in the dimensions of the products.

If it is possible to gauge and adapt the machine rapidly, it should also be possible to adapt the machine easily in order to accommodate the manufacture of different products.

The fact that this possibility is not available is considered a disadvantage of the above-mentioned procedure and/or machine.

The object of the present invention is to reveal a procedure which does not have the stated disadvantages.

According to the invention, the stated object is achieved by the procedure of the generic type mentioned in the introduction as is defined in the defining clause of claim 1.

In the present instance, the invention relates firstly to a positioning procedure to detect the relative position between a workpiece and a grinding wheel and/or the grinding edge of such on a cylindrical grinding machine. It also relates to a mathematical operation perform within the control system, to calculate the alteration in position of the grinding wheel so that the resulting position of the grinding wheel can, once it has been swiveled, be expressed and/or displayed at any time by means of the coordinates X and Z. Furthermore, knowing the position of the grinding wheel and/or of the grinding edge of the same within the coordinate system of the machine, also enables a compensatory movement of the grinding wheel pivot, for example, to be carried out in such a manner that the grinding edge of the grinding wheel remains stationary while the grinding head swivels.

Figure 2:
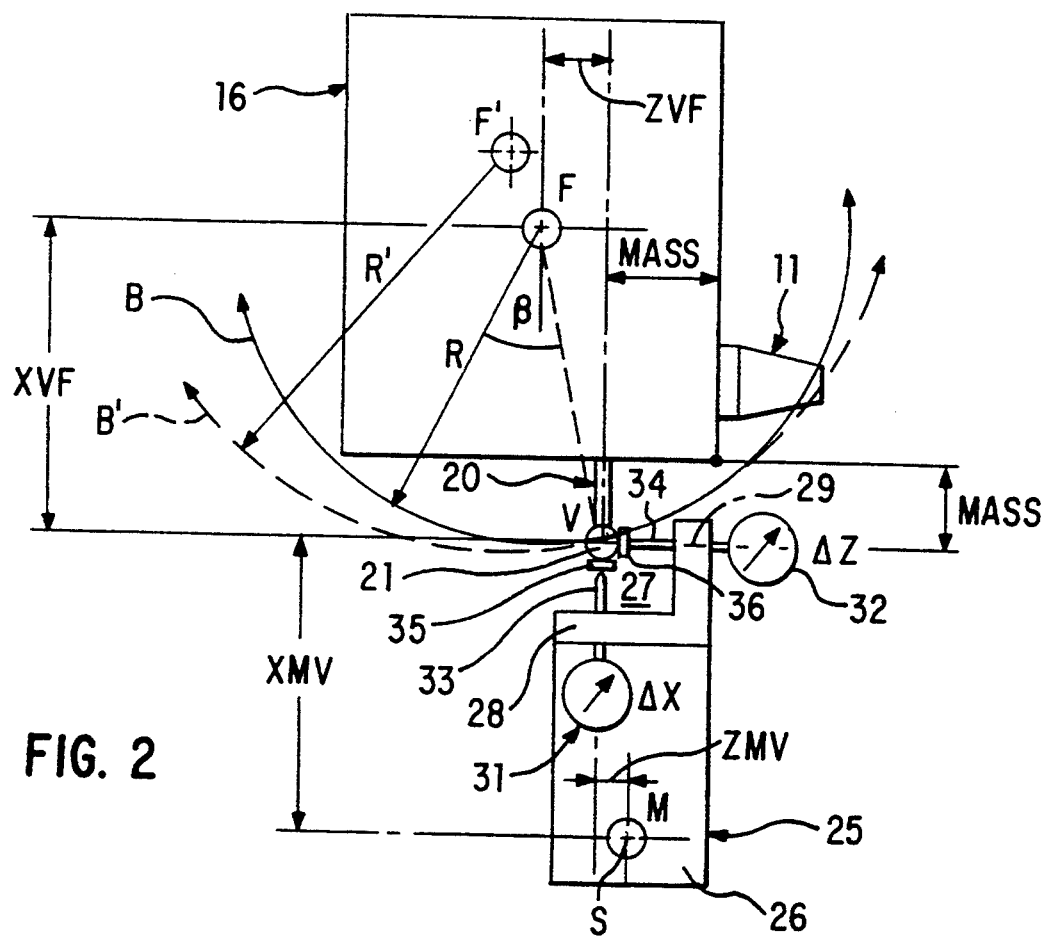
Figure 9:
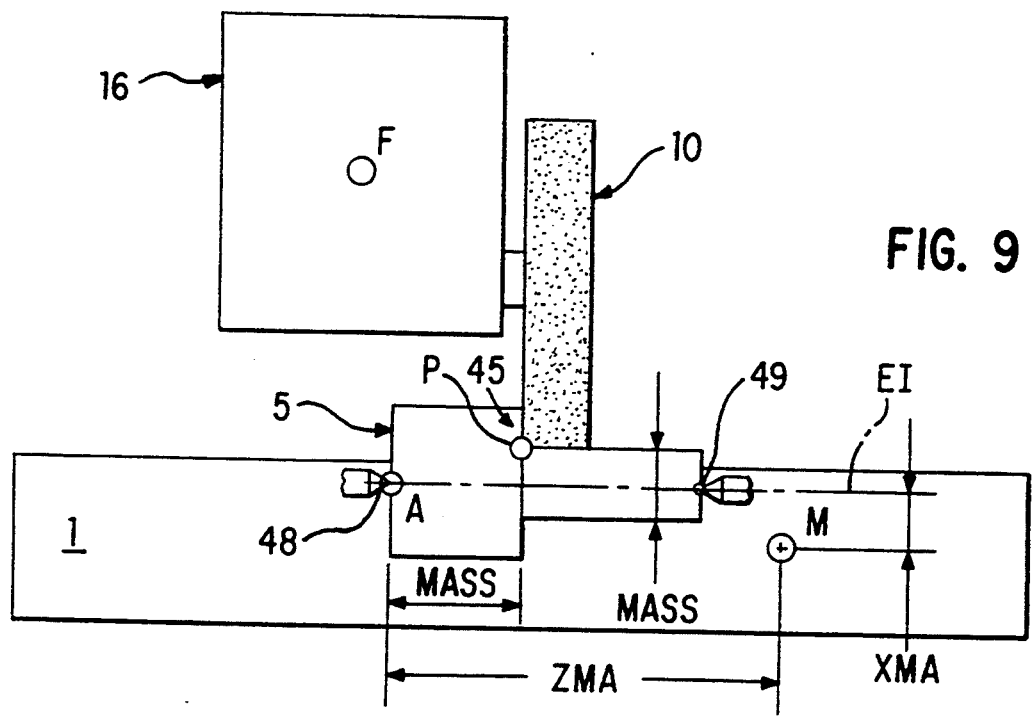
Figure 4:
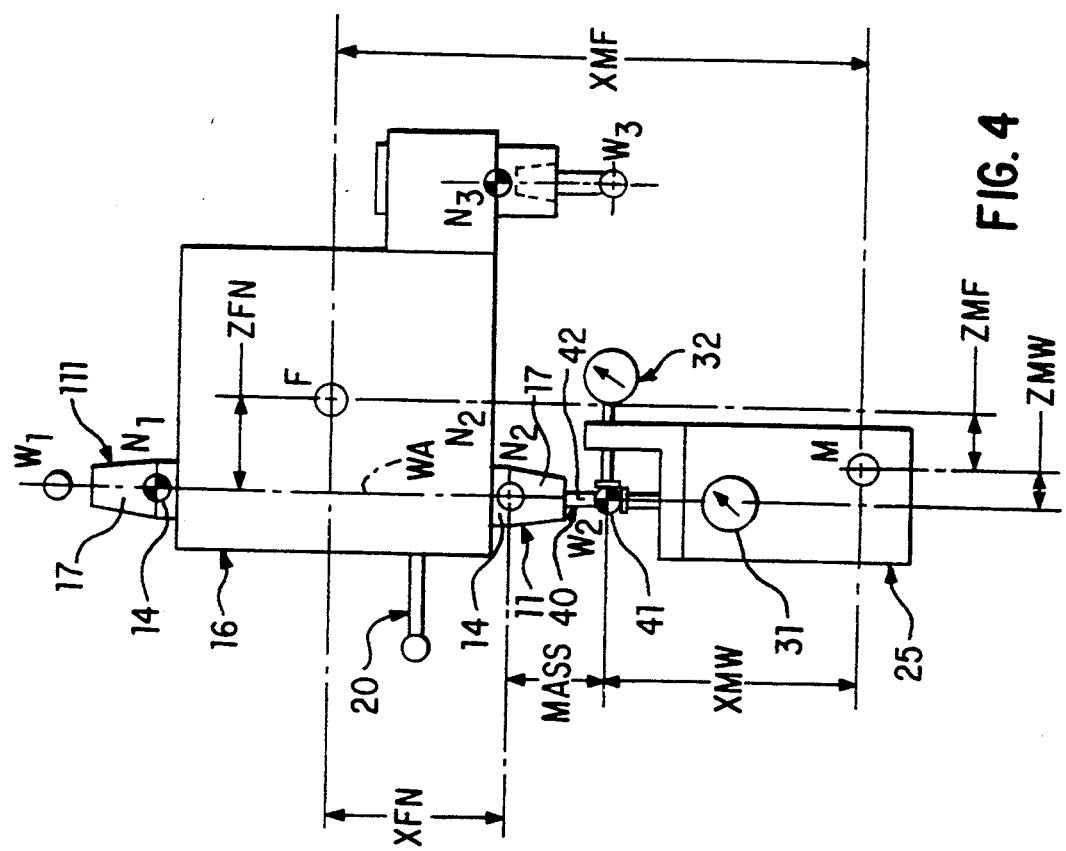
Figure 3:
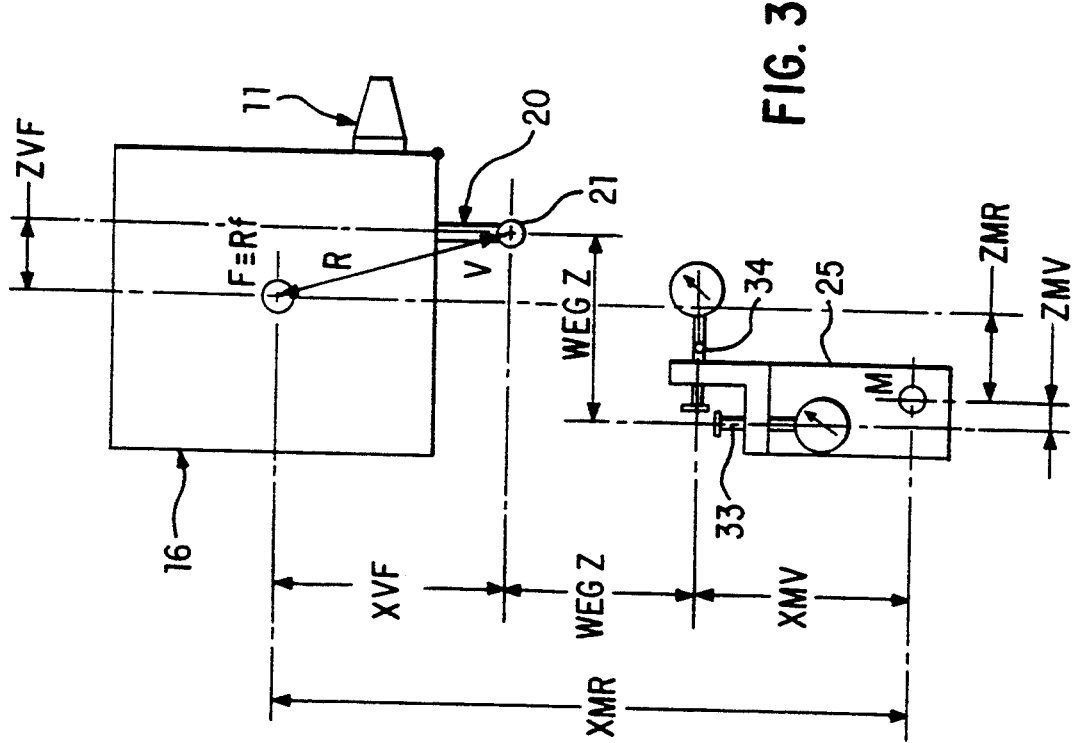
Figure 5:
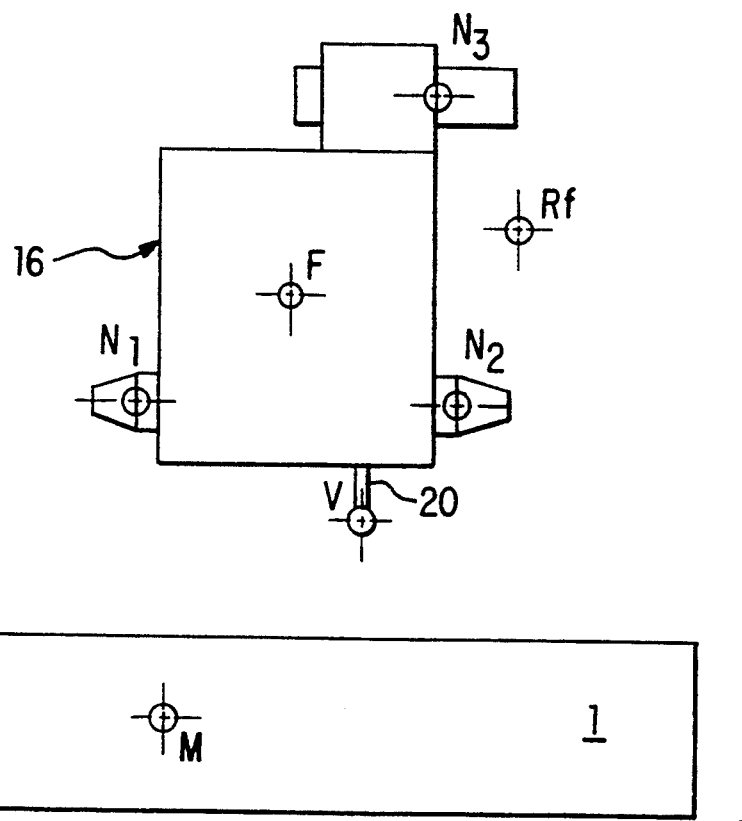
Figure 6:
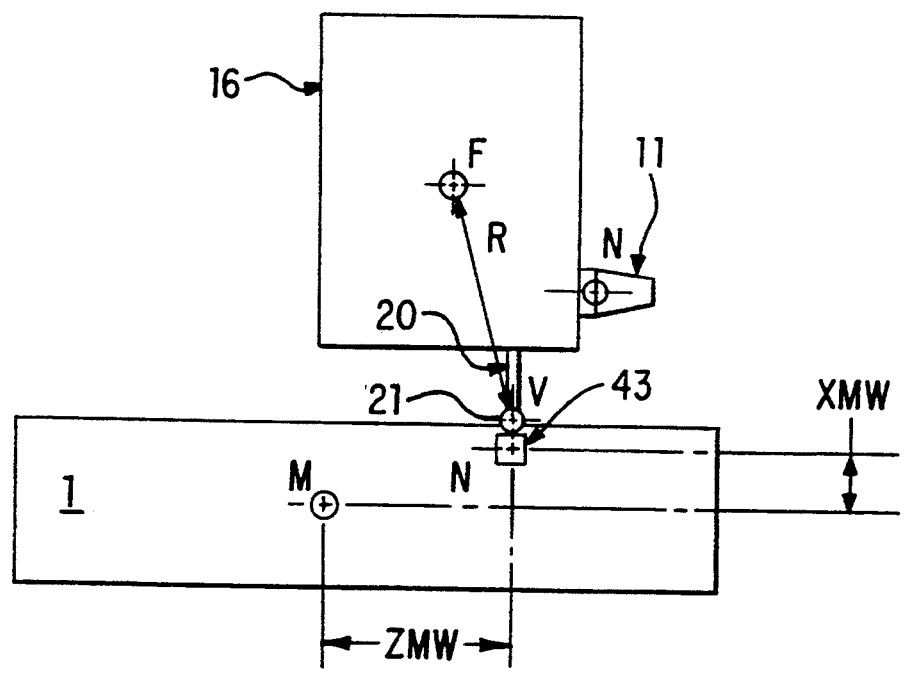
Figure 7:
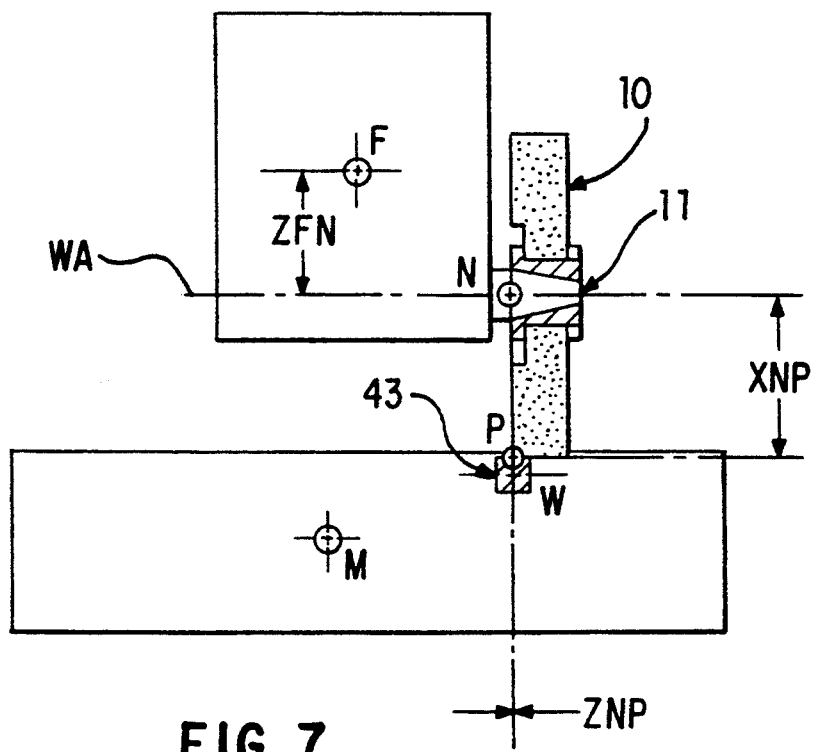
Figure 8:
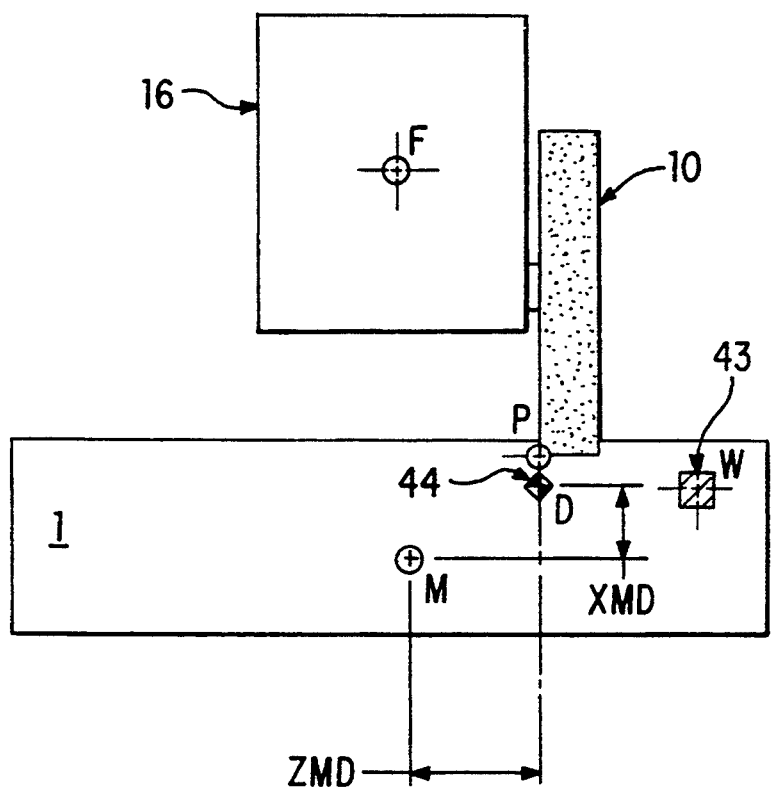
Figures 10A, 10B:
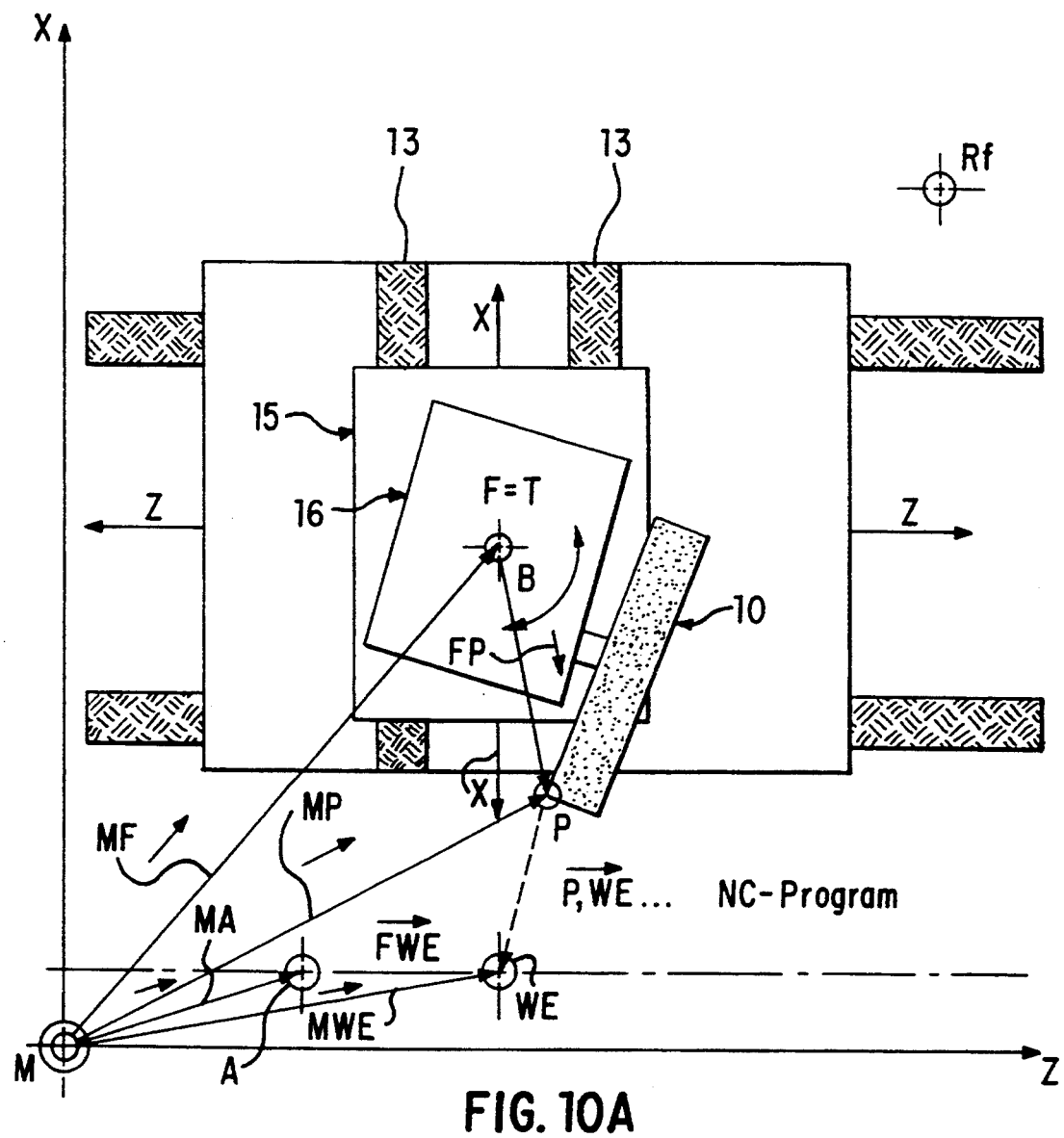

Embodiment possibilities of the present invention are explained in greater detail below with reference to the attached drawings, in which:

FIG. 1 shows in horizontal perspective and in diagram form a grinding machine in which the wok holder takes the form of a slide, FIG. 2 shows an extract from FIG. 1 in which only those parts of the machine appear which are required for gauging the position of the slide reference point in relation to the zero of the machine, FIG. 3 shows an extract from FIG. 1, in which only those parts of the machine appear which are required for gauging the position of a reference point in relation to the zero of the machine, FIG. 4 shows an extract from FIG. 1 in which only those parts of the machine appear which are required for gauging the position of a workpiece chucking point in relation to the zero of the machine, FIG. 5 shows in diagram form points whose coordinates are known when gauging of the machine has been completed, FIG. 6 shows an extract from FIG. 1 in which only those parts of the machine appear which are required for gauging the position of a measuring cube on the machine bed, FIG. 7 shows an extract from FIG. 1 in which only those parts of the machine appear which are required for gauging the position of the grinding wheel of the machine, FIG. 8 shows an extract from FIG. 1 in which only those parts of the machine appear which are required for gauging the position of a dressing diamond in relation to the zero of the machine, FIG. 9 shows an extract from FIG. 1 in which only those parts of the machine appear which are required for gauging the position of the workpiece zero and FIGS. 10a and 10b show an extract similar to FIG. 1 of a grinding machine on which the work holder is rigidly attached to the machine bed and on which the workpiece slide constitutes a component part of a cross slide.

One of the grinding machines on which the present procedure can be applied is shown in horizontal projection and in diagram form in FIG. 1. This machine has a bed or base 1 which has an essentially T-shaped outline. On the upper side of the short arm 2 of this T-shaped bed 1 there are slideways 3 provided along which a slide 4 can move. This slide 4 is intended to receive a workpiece 5 and is therefore hereinafter designated workpiece slide 4.

In the case illustrated, a table 6 is swiveled on the workpiece slide 4. On this table 6, there is a chuck 7 for the workpiece 5, which incorporates a headstock 71 and a tailstock 72, wherein the headstock 71 turns on the swivelling table 6. The headstock 71 contains a shaft 8 and on the free end of this shaft 8 there is a chuck 9 for the workpiece 5.

On the upper side of the long arm 12 of the T-shaped machine bed or base 1 there are slideways 13 for a mobile wheelslide 15 to move along this long arm 12. A wheelhead 16 swivels or turns on this wheelslide 15. This wheelslide 15 is also called a grinding slide 15. An exchangeable grinding wheel 10 is fixed onto the end of a shaft 11 which projects from at least one of the side walls of the wheelhead 16 housing. This is advantageously attached by means of a cone 17 at the end of the shaft 11 and a chuck 18 in the grinding wheel 10 which sits on the cone 17. The grinding wheel 10 is attached by means of a nut 19 to the shaft 11 which can be screwed onto an external part (not shown) of the cone 17.

A measuring gauge 20 consisting of a spherical measuring head 21 and a distance bar or spacing rod 22 projects from one of the side walls of the wheelhead 16, preferably a different wall from that of the wheelhead 16 in which the shaft 11 is housed. The spherical measuring head 21 is attached to the wheelhead 16 by means of the distance bar or spacing rod 22. The dimensions of both the rod 22 and the head 21 are known and are part of the machine data. The midpoint of the spherical measuring head 21 of the gauge 20 is marked with a V. This midpoint V can also be considered as a measuring point since it is referred to by the coordinates X and Z which indicate the position of the measuring head 21 in the coordinate system X, Z of the machine.

In order to enable the workpiece 5 to be processed by the numerically controlled grinding wheel 10 there are certain points on the machine by which the computer program in charge of the grinding of the workpiece can orientate itself while controlling the movements of the grinding wheel 10. The first of these points is the point known as the zero M of the machine. On this type of machine, this point is situated within range of the workpiece slide 4. In the case illustrated, the zero M of the machine coincides with the vertical axis, i.e. the axis running perpendicular to the swivelling table 6 of the workpiece. This zero M of the machine also coincides with the zero of the coordinates of the machine. The X axis of the coordinate system runs in the longitudinal direction of the long arm 12 of the T-shaped bed or base 1. The Y axis of this coordinate system runs vertically, respectively perpendicularly to the bed 1, and coincides with the axis of the swivelling table 6. In the present case the Y axis passes through the zero M of the machine.

Another of the points mentioned is the so-called reference point Rf of the machine. This reference point Rf is located in an area of the bed or base 1 which the wheelhead 16 can be assumed unlikely to reach during the processing of the workpiece 5, but which is nevertheless within reach of the wheelhead 16. The reference point Rf is at a distance from the zero M of the machine. The reference point Rf can be defined and/or simulated by electronic means.

On the wheelhead 16 there is a point F through which the swivel axis of this wheelhead 16 passes. This point F can also be designated slide reference point F. The reference point Rf on the bed 1 is considered to have been approached by the wheelhead 16 when the slide reference point F is exactly above the reference point Rf. Other points on the machine which are of significance in the present context will be described in detail below.

Before a numerically controlled grinding machine can be put into operation, it must be gauged. This means that it is necessary to detect the position of those points on the machine which will serve as determining points for the control program. The coordinates X and Y of these points are memorized. The greatest problems arise while gauging the position of the point F, and/or the swivel axis of the wheelhead 16 in relation to the zero M of the machine. This is because the wheelhead 16 is located on the wheelslide 15 and the axes X and Z also lie in the same plane on the workpiece slide 4 relative to the zero M of the machine, in which the wheelhead 16 can be shifted. Furthermore, detecting the position of point F is made even more difficult by the fact that there are no keys or similar on the machine to enable the position of the swivel axis or slide reference point F to be detected exactly, i.e. with the precision required for grinding. Theoretically, the machine could be measured by hand with a rule and the measured values entered in the machine in the usual way. However, such a procedure would lack the exact precision that is necessary for precision grinding.

FIG. 2 essentially shows an extract from FIG. 1 in which only those parts of the machine appear which are required for gauging the position of the slide reference point or axis F relative to the zero M of the machine. The only part of the bed 1 shown in FIG. 2 is the zero M of the machine. A measuring device 25 is provided, which comprises a base plate 26 wherein this base plate 26 is attached to the workpiece slide 4. The base plate 26 has a reference mark S which is indicated by a cross. The center point of this mark S is assigned precisely to the zero M of the machine. The measuring device 25 may also be set up at different places on the workpiece slide 4.

In one of the corners of the base plate 26 of the measuring device 25, there is a rectangular recess 27. A dial gauge 31 or 32 is assigned to each of the arms 28 or 29 respectively of this rectangular recess 27 in such a manner that the measuring pin 33 or 34 of the respective dial gauge 31 or 32 is at right angles to the arm 28 or 29 respectively, through which it passes. Thus together, the faces of the face plate 35 or 36 on the end of the measuring pin 33 or 34 respectively, also form a right angle and can form a limit surface for the spherical measuring head 21 of the gauge 20 attached to the wheelhead 16. When the spherical measuring head 21 of the gauge 20 is in the position shown in FIG. 2 relative to the measuring device 25, the dial gauges 31 and 32 together with the distance of the same from the zero M of the base plate 26 indicate the distance of the midpoint V of the zero M of the machine in the direction of the X axis as XMV, and in the direction of the Z axis as ZMV. The distances of the axis F from midpoint V are indicated as XVF and ZVF, whereby these distances are invariable since the gauge is attached to the wheelhead 16.

Should the position of the spherical measuring head 21 relative to the measuring device 25 change only slightly, only the those distances indicated by the dial gauge 31 and 32 as Delta X and Delta Y respectively would alter. If the spherical measuring head 21 were shifted, this being longer than the displacement path of the measuring pins 33 and 34, the entire measuring device 25 would have to be adjusted accordingly in order for the position of the spherical measuring head 21 to be detected.

It is understood that the wheelhead 16 can be swivelled around the shaft 30, respectively around its axis F, by means of an appropriate drive (not shown) regardless of whether the exact position of point F in relation to zero M of the machine is known or not. The slide swivel axis F runs parallel to the X axis of the coordinate system of the machine. The distance R or R' of the ball midpoint V from swivel axis F is invariable since the gauge 20 is attached to the wheelhead 16. From the point of view of the machine or the machine program, the amount of this distance R or R' is not known precisely since the machine does not yet know the position of point F. When the ball midpoint V is swivelled around the swivel axis F V then moves along a path B or B' which takes the form of an arc. R or R' is the radius of the corresponding circle and F is the center of this circle.

When detecting the exact position of point F, start with an assumed and/or approximate position of this point, e.g. determined by manual measurement, in relation to the zero M of the machine, as well as with a radius R', also approximate, determined e.g. by manual measurement. These data can be keyed into the machine manually and serve as initial data which will be made more precise in the following steps. In order to improve the precision of these data, the measuring device 25 is positioned in such a way that the reference mark S of the measuring device 25 coincides with zero M of the machine in the manner already described. The spherical measuring head 21 is brought into contact with the face plates 35 and 36 of the measuring device 25, and the position of the ball midpoint V is detected with the aid of the dial gauges 31 and 32 taking the known measurements of the spherical measuring head 21 as a starting point. These values can be expressed as coordinates of the ball midpoint V in the measuring system of the machine and can be stored in the machine's memory.

In order to carry out the present procedure the gauge 20 is attached to the wheelhead 16, advantageously to its housing 23. The measuring device 25 is arranged on the workpiece slide 4 in such a way that the reference mark S on this measuring device 25 lies directly above the zero M of the machine. The head 21 of the gauge 20 is brought to rest against the face plates 35 and 36 of the measuring device 25 arranged in this way. The spherical measuring head 21 is now in its starting position and the coordinates of the ball midpoint V on the spherical measuring head 21, based on the data provided by the measuring device 25, are stored in a control unit which is one of the component parts of the machine. The swivel axis of the wheelhead 16 is now in its initial position F and the coordinates of this position, which are only assumed or which result from measuring the machine by means of a rule, are also stored in the memory. These data are memorized so that they can be checked an if necessary made more precise during the continuation of this procedure.

After this, the control unit, which also comprises a computer, calculates where the ball midpoint V on the spherical measuring head 21 would be or should be if the rotatable wheelhead 16 were pivoted through a specified angle around the swivel shaft 30 or the pivot F. Since the wheelhead 16 is swivelled around its shaft 30, it is known in advance that the path B along which the point V on the spherical measuring head 21 will move, will take the form of an arc. At this moment however the exact position of the swivel axis F in relation to the origin of the coordinate system X, Z of the machine is unknown.

The coordinates of the calculated final position and/or swivel position of the ball midpoint V are stored in the memory. Then the wheelhead 16 is swivelled through the specified angle around the shaft 30. This angle beta may, for example, be 30 degrees and the swivel movement may be carried out clockwise around the axis F or F', F' represents that position of the shaft 30 of the wheelhead 16 resulting from an approximate measurement. F is that position of the shaft 30 of the wheelhead 16 shown in FIG. 1 which results from the procedure explained here. Likewise with regard to the definition of the parameters or radii R and R', as well as the paths B and B'.

Once the spherical measuring head 21 has reached its final or swivel position, a check is carried out to determine whether there is a discrepancy between the actual and the estimated final or swivel position of the spherical measuring head 21. This can be determined by shifting the workpiece slide 4, on which the measuring device 25 is arranged, in the Z-axis direction into that area of the machine where the spherical measuring head 21 is supposed to be located according to the aforesaid calculations. The wheelhead 16 carrying the spherical measuring head 21, on the other hand, is shifted in the X-axis direction until the spherical measuring head 21 also comes into contact with the measuring device 25.

The measuring system of the machine for the Z-axis direction indicates, possibly in combination with the appropriate dial gauge 32 of the measuring device 25, the actual Z coordinates of the point V in the spherical measuring head 21, whereby this distance resulted from the distance travelled by the workpiece slide 4. Since the value of this coordinate has been determined by the measuring system of the machine, it can be stored in the machine, preferably by automatic means. The measuring system of the machine for the X-axis direction, possibly in combination with the appropriate dial gauge 31 of the measuring device 25, enables the actual X-coordinates of the point V in the spherical measuring head 21 to be detected, whereby this distance results from the displacement of the wheelhead 16 until it makes contact with the spherical measuring head 21 on the measuring pin 33 of the dial gauge 31.

In most cases, at the beginning of the measuring process, the actual position of the ball midpoint V at the end of the swivel movement will deviate from the estimated or assumed position of the same, because of the imprecision of the position of the swivel axis F' and the imprecision of the size of radius R'. The extent of this discrepancy can be precisely detected by means of the dial gauges 31 and 32 on the measuring device 25. The data from the dial gauges 31 and 32 can be entered in the memory of the machine as distances Delta X and Delta Z.

For the next part of the procedure, the following are known: the coordinates of the original starting position of the ball midpoint V, the assumed final position of the same after swivelling the spherical measuring head 21 through the 30 degree angle beta and the real final position of the ball midpoint V after swivelling the spherical measuring head 21 as mentioned. The coordinates of these three points are stored in the machine. From these values, the machine can use a known procedure, e.g. by means of a circular regression, to detect the deviation of the assumed position of the swivel axis F of the wheelhead 16 from the actual position F' of the same. The coordinates stored in the machine relevant to the originally assumed position of the swivel axis F' can thus be corrected accordingly.

If there is a discrepancy between the actual and the estimated final position of the spherical measuring head 21, the spherical measuring head 21 is swivelled back from its final position to its initial position. The shaft 30 of the wheelhead 16 is displaced in relation to the bed 1 in such a way that the swivel axis F' is situated in the position determined by the corrective procedure. The shaft 30 of the wheelhead 16 is thus shifted a short distance in one direction so that the swivel axis 30 of the wheelhead 16 is put into a different position F'. Taking the corrected position of the swivel axis F' and the corrected radius R' as starting point, a new assumed final position of the spherical measuring head 21 at the end of the aforesaid swivel path B' of the wheelhead 16 is calculated. This takes place in the control unit in which the expected swivel position of the spherical measuring head 21 is calculated when this is swung through a specified angle. Thus angle can be equivalent to any angle which has been selected during the aforementioned swivel movement of the wheelhead 16. The wheelhead 16 is now swivelled through the specified angle and a check is carried out in the previously mentioned manner to determine whether there is a discrepancy between the actual and the estimated swivel position of the spherical measuring head 21.

The machine compares the extent of the deviations mentioned in a sequence of measurements. If the extent of the deviation increases, the shaft 30 of the wheelhead 16 has been shifted in the wrong direction. The direction in which the shaft 30 of the wheelhead 16 is shifted is changed in such a case. The 30 is shifted in the other direction and another measurement performed. On completion of this measuring process, the extent of the deviation just determined is compared with that deviation which was determined during the previous measuring process. The position of the shaft 30 is altered accordingly and a further measurement taken. The measurements are taken with the machine until there is no longer any discrepancy between the estimated and the actual final or swivel position of the spherical measuring head 21. In this case, the coordinates of the swivel axis F of the wheelhead 16 are saved for future use.

When there is no longer any discrepancy, the assumed position of the spherical measuring head 21 coincides with the actual position of the same. This results from the fact that the coordinates of the measuring point V on the spherical measuring head 21 coincide in both initial and final positions of the swivel movement. From this moment on it is true that the correct and precise coordinates of the swivel axis F in the coordinate system of the machine have been detected and can be stored in the memory of the machine. Consequently, the distance between the swivel axis F and the zero M of the machine is also known or, at least, can be detected at any time, since the position of the zero M of the machine is given by the design of the machine.

The previously mentioned arc-shaped path B of the ball midpoint V can be gauged approximately by certain points situated on this path B. The coordinates of these points can be measured, e.g. by means of the measuring device 25 attached to the work holder. These points can be used to detect the coordinates of the swivel axis F of the wheelhead 16. For this, the machine starts from the coordinates of the points of that path B travelled by the spherical measuring head 21 on which there is no discrepancy between the estimated and the actual final position of the spherical measuring head 21. Starting with the coordinates of these points as well as with the coordinates of the position of the swivel axis F of the wheelhead 16, the radius R of that arc forming the path B is detected. This is carried out using known mathematical procedures.

Detecting the coordinates of the reference point Rf can be shown by means of FIG. 3. As already explained, the position of the swivel axis F of the wheelhead 16 is already known and the coordinates of this position are memorized in the machine. In order to detect the coordinates of the reference point Rf, the wheelhead 16 is moved until the swivel axis of the same or the point F which corresponds to this coincides with the reference point Rf on the machine bed 1. Since the measuring system of the machine indicates the position of the swivel axis F at that moment, the reference point Rf which coincides with the point F has the same coordinates as the swivel axis F. The coordinates of the point F are XMR and ZMR and because of the coincidental position of points F and Rf, these are also the coordinates of the point Rf.

The angle position of the point Rf in relation to the zero M of the machine in the coordinate system of the machine is detected by moving the wheelhead 16 from the zero M of the machine into the reference point Rf first in one direction and then in the other, for instance first in the direction of the X-axis and then in the direction of the Z-axis. In this way the measuring system of the machine provides the data about the angle of that vector which connects the points M and Rf. The machine and/or the measuring system thus also serves as a measuring device.

Since the distance R between the slide reference point F and the measuring point V in the spherical measuring head 21 is already known, this distance R can be expressed by means of the coordinates XVF and ZVF. These coordinates make it possible to detect the coordinates path X and path Y of that distance which lies between the measuring point V and the center of the measuring space in the measuring device 25. In this case, it is assumed that the distances between the zero M of the machine and the axes of the measuring pins 33 and/or 34 respectively are given by the design of the machine and are therefore known.

FIG. 4 shows an extract from FIG. 1, in which only those parts of the machine appear which are required for gauging the position of a tool clamping point N in relation to the swivel axis F of the wheelhead 16. On the wheelhead 16 there are frequently at least two shafts 11, 111 etc. One of these shafts 11 or 111 might, for instance, carry a tool for OD cylindrical grinding and the other shaft may carry a tool for ID cylindrical grinding (not shown). In the area of the larger base of the cone 17, the latter is connected in one piece to the cylindrical part 14 of the shaft 11 or 111. In the middle of the aforesaid cone base, i.e. lying on the axis of the shaft WA, there is the point N which will be called the tool clamping point. If the head 16 has more than one shaft 11 or 111 etc., the designations of these shafts is indexed, i.e. they are designated N1, N2 etc.

A gauge 40 is used to detect the position of the tool clamping point N2. This gauge 40 also has a spherical measuring head 41 and a spacing rod 42 as has already been explained in connection with the description of the gauge 20. In the case of the present gauge 40 however the spacing rod 42 is constructed in such a way that it can be inserted into a bore-hole in the cone 17 of the shaft 11. The dimensions of the rod 42 and of the bore-hole in the cone 17 are designed in such a way that the distance between the tool clamping point N2 and the measuring point W2 in the spherical measuring head 41 is known precisely.

The measuring device 25 situated at the zero M of the machine is approached by the spherical measuring head 41 of the gauge 40, as shown in FIG. 4. Delta X and Delta Y are equal to zero here, since the dial gauges 31 and 32 of this measuring device 25 have been set to zero. The position of the swivel axis F of the wheelhead 16 is, as has previously been explained, already known. The distance between the tool clamping point N2 and the swivel axis F can thus be identified by means of the coordinates XFN and ZFN, as can be seen from FIG. 4. If the wheelhead 16 has several shafts, each is equipped with a gauge 40, according to which the measuring device 25 is approached etc. The coordinates of the corresponding points N are detected and memorized in accordance with this.

FIG. 5 shows those points of the machine whose position is known on completion of gauging the machine. These are the reference points F on the wheelslide 15 and on the wheelhead 16, the measuring point V on the gauge 20, the reference point Rf as well as the tool clamping points N1, N2 etc.

Furthermore, the grinding wheel 10 is also measured during this process. This takes place in two stages, the first being described with reference to FIG. 6 and the second with reference to FIG. 7. First, a measuring cube 43 is set in such a way that the walls of the said cube are parallel to the X and Z axes. With the gauge 20 attached to the wheelhead 16, first one wall of the measuring cube 43 is scanned and then a second wall of the same, which is at right angles to the first mentioned wall of the measuring cube 43. Since the distance R between the F and V, as well as the diameter of the spherical measuring head 21, are precisely known, the position of the center W of the measuring cube 43 can be detected precisely by means of precise dimensions already known, and can then be memorized.

On this basis, the position of the grinding edge P of the grinding wheel 10 (FIG. 7) is now detected. The distance between the axis WA of the shaft 11 for the grinding wheel 10 and the point F is already known and this is indicated by ZFN, as has previously been explained in connection with FIG. 4. The distance XNP between the tool clamping point N on the shaft 11 and the grinding edge P of the grinding wheel 10 must also be detected. Since the position of the top horizontal wall of the measuring cube 43 which runs parallel to the Z axis is already known, it is sufficient to set the grinding wheel 10 to this cube wall. From the distance travelled by the swivel axis F in the direction of the X axis during this feed, it is possible to determine the distance XNP. This is also then memorized.

It is also necessary to determine the distance ZNP which indicates the position of the grinding edge P of the 10 in direction of the Z axis in relation to the tool clamping point N of the same. From one of the previously described measuring procedures, the positions of the side walls of the measuring cube 43 in the direction of the Z axis are also known. In order to determine ZNP, one of the lateral walls of the 43 is approached with the face of the grinding wheel 10 parallel to the X axis. The intersection of this with the revolving surface of the grinding wheel 10 defines the point P. Since the distance between F and N, as well as the position of the lateral side of the cube which has been approached, are already known, ZNP can be determined from the amount of feed of the point F required in order to approach the side of the cube.

A dressing diamond 44 is normally used to dress the grinding wheel 10. To enable the grinding wheel 10 also to be dressed automatically by the machine, the exact position of the dressing diamond 44 must also be known. The diamond 44 is arranged on a somewhat remote part of the workpiece slide 4 near the measuring cube 43. Since the position of the grinding edge P of the grinding wheel 10 is now already known, it is sufficient to approach the diamond 44 with the grinding edge P of the grinding wheel 10 on two faces of the same and to memorize those coordinates of the swivel axis F which belong to the grinding edge P.

In order to process a workpiece 5, the position of the zero A of the same must be known. How to detect this zero A can be explained with reference to FIG. 9. The distance between the swivel axis f and the grinding edge P of the grinding wheel 10 is known from the previous operating sequences. The workpiece 5 is clamped between the work holder 71 and tho tailstock 72. In the case illustrated, the workpiece 5 has a shoulder 45. The zero A of the workpiece 5 is situated on that face of the workpiece 5 clamped by the workholder 71. The diameter of the thicker section and of the thinner section of the workpiece 5 as well as the length of the aforementioned workpiece section is given by the type of workpiece 5 in each instance. These dimensions are indicated by the word MASS (=dimension) in FIG. 9.

The distance XMA running in the direction of the X axis between the axis EI, which passes through the workpiece locating points 48 and 49 and the zero M of the machine is given by the design of the machine and is thus known. The exact dimensions (MASSE) of the workpiece 5 are also known. The only unknown quantity is the position of the workpiece zero A, i.e. of point 48 in the direction of the Z axis, since the workheads 48 and 49 can be shifted in the direction of the Z axis.

After the workpiece 5 has been firmly clamped between the chuck jaws 48 and 49, the grinding edge P of the grinding wheel 10 is introduced into the interior of the shoulder 45. The member of the shoulder 45 running radially is preground by the grinding wheel 10 and then the position of the grinding edge P is detected by the measuring system of the machine. By taking into account the known length of the thicker section of the workpiece 5 and the known distance between the grinding edge P and the zero M of the machine, the distance ZMA between the zero M of the machine and the zero A of workpiece 5 in the direction of the Z axis can be found.

For the actual processing of the workpiece 5, it is convenient to treat the aforementioned distances in the direction of the X and Z axes as components of vectors and to find the corresponding vectors from these distances. In FIG. 10, the essential components of the machine according to FIG. 1 are shown at least in schematic form. Vectors resulting from the components that have been determined are assigned to these components. These vectors can serve as the basis for the program for the numerically controlled processing of workpieces.

The machine bed 1 is indicated in FIG. 10 by the zero M of the machine. The workpiece 5 is indicated by the workpiece zero A and by a point WE of the same, at which the grinding wheel 10 should make contact when grinding the workpiece 5 at this point. From the components determined as previously described, the following vectors result: vector MF between the zero M of the machine and the slide reference point F, vector MP between the zero M of the machine and the grinding edge P of the grinding wheel 10, and vector MA between the zero M of the machine and the workpiece zero A.

The vector MWE drawn in FIG. 10 results from the program that this part WE of the workpiece should be processed. Before this part WE of the workpiece is processed, the grinding edge P of the grinding wheel 10 is generally situated at a distance from this part of the workpiece WE. From the position of the part of the workpiece WE and the grinding edge P of the grinding wheel 10 in the measuring system of the machine, the program must determine the vector MWE. In addition, the program must determine the components of this vector MWE and then corresponding control signals are transmitted to the drives of the machine to enable the grinding edge P of the grinding wheel 10 to be brought to the part of the workpiece WE.

We claim:

1. A procedure for the numerically controlled processing of a workpiece on a grinding machine having a workholder for the workpiece as well as a wheelhead equipped with a grinding wheel, the wheelhead being pivoted on a wheelslide and able to be shifted together with the wheelslide in relation to the workholder, comprising
   detecting positions of a set of points situated within a working range of the grinding machine,
   converting coordinates of the set of points into basic data for a processing program of the grinding machine, and
   taking the basic data of the coordinates of the set of points into account while the workpiece is processed,
   wherein a first gauge is attached to the wheelhead, or optionally attached to a housing of the wheelhead, and to a measuring device in at a zero (M) of the machine,
   wherein a spherical measuring head of the first gauge presents a measuring point (V) for detecting an initial position of the spherical measuring head in a coordinate system (X,Z) of the machine,
   wherein coordinates of an existing position of the spherical measuring head, are detected with the aid of the measuring device,
   wherein subsequently a control unit, being a component part of the grinding machine, enables an end position of the spherical measuring head to be detected where the measuring point (V) of the spherical measuring head would be if the wheelhead, which can be swivelled around a swivel axis (F), is swivelled through a specified angle, whereby the measuring point (V) passes through a displacement path (B) and,
   wherein a check is performed to verify whether there is any discrepancy between an actual position of the spherical measuring head and the end position of the spherical measuring head.

2. Procedure as claimed in claim 1 wherein the wheelhead is swivelled back from the actual position into the initial position if there is any discrepancy between the actual position of the spherical measuring head and the end position of the spherical measuring head, wherein a shaft of the wheelhead is shifted within the coordinate system (X,Z) of the machine so that the swivel axis (F) of the wheelhead is brought into a different position (F'), wherein it is possible to calculate an expected swivel position of the spherical measuring head when the spherical measuring head is swung through a specified angle, wherein the wheelhead is swivelled through the specified angle and wherein a check is performed to verify whether there is any discrepancy between the actual position of the spherical measuring head and the expected swivel position of the spherical measuring head.

3. Procedure as claimed in claim 2 wherein coordinates of the swivel axis (F) of the wheelhead are stored in a memory as soon as there is no longer any discrepancy between the actual position of the measuring point (V) on the spherical measuring head and the expected swivel position of the spherical measuring head.

4. Procedure as claimed in claim 1 wherein coordinates of the swivel axis (F) of the wheelhead are stored in a memory as soon as there is no longer any discrepancy between the actual position of the spherical measuring head and the end position of the spherical measuring head.

5. Procedure as claimed in claim 4 wherein coordinates of points on the displacement path (B) of the measuring point (V) are measured, optionally by means of the measuring device attached to the workholder, and wherein a radium (R) of an arc defined by the displacement path (B) is detected from the coordinates of the points on the displacement path (B) as well as from the coordinates of the swivel axis (F) of the wheelhead.

6. Procedure as claimed in claim 4 wherein a position of a swivel shaft and a position of the swivel axis (F) of the wheelhead are simultaneously altered by a swivel movement of the grinding wheel around the swivel axis (F) of the wheelhead in such a manner that the grinding wheel is swivelled around at least one edge of the grinding wheel without altering coordinates (X,Z) of the at least one edge of the grinding wheel.

7. Procedure as claimed in claim 1 wherein a second gauge is assigned to a shaft on the wheelhead that bears the grinding wheel, wherein a distance between a measuring point of the second gauge and a clamping point (N) of the grinding wheel on the shaft is known, wherein the measuring device arranged the zero M of the machine is approached by the second gauge and wherein the coordinates of the tool clamping point (N) are memorized in the control unit.

8. Procedure as claimed in claim 1 wherein a measuring cube is attached to the workholder, wherein the measuring cube is approached by the first gauge on the wheelhead and wherein coordinates of the measuring cube are memorized.

9. Procedure as claimed in claim 4 wherein the measuring cube is approached in order to detect the position of an edge of the grinding wheel.

10. Procedure as claimed in claim 9 wherein the position of a dressing diamond is detected by approaching the dressing diamond with a tool.

11. Procedure as claimed in claim 9 wherein a position of a zero (A) of the workpiece is detected by approaching a shoulder of the workpiece with an edge of the grinding wheel and wherein the the position of the zero (A) of the workpiece is memorized.

12. Procedure as claimed in claim 9 wherein coordinates (X,Z) of at least one edge of the grinding wheel are detected after the wheelhead has performed a rotating movement around the swivel axis (F) of the wheelhead through a specified angle beta and wherein a new position of the at least one edge of the grinding wheel after swivelling is expressed in terms of coordinates (X,Z).

13. Procedure as claimed in claim 12 wherein a position of a swivel shaft and a position of the swivel axis (F) of the wheelhead are simultaneously altered by a swivel movement of the grinding wheel around the swivel axis (F) in such a manner that the grinding wheel is swivelled around at least one edge of the grinding wheel without altering coordinates (X, Z) of the at least one edge of the grinding wheel.

* * * * *